Sept. 21, 1948. LE ROY H. RAND Re. 23,040

BABY PANTS

Original Filed Feb. 28, 1945

Inventor
Leroy H. Rand.

By KARL W. FLOCKS
Attorney

Reissued Sept. 21, 1948 Re. 23,040

UNITED STATES PATENT OFFICE 23,040

BABY PANTS

Le Roy H. Rand, Brooklyn, N. Y., assignor to Rand Rubber Company, Brooklyn, N. Y., a corporation of New York Original No. 2,397,751, dated April 2, 1946, Serial No. 580,281, February 28, 1945. Application for reissue August 1, 1946, Serial No. 687,561

7 Claims. (Cl. 128—288)

This invention relates to garments such as baby pants and the like and more particularly to garments of compounded synthetic film materials having the characteristics of being waterproof, while being pervious to the passage of moisture vapor therethrough and to water repellent baby pants having elastic stitched on the margins of the openings such as at the lower margin of each pant and at the waist.

Prior to the instant invention, baby pants have been made of rubber and of coated fabric. Prior attempts to make baby pants of synthetics utilizing neither rubber nor fabric have resulted in pants to which elastic can not be stitched at the margins with the use of conventional sewing machinery so that such baby pants made of synthetic sheet material may not be readily elasticized at the margins such as at the bottom of each pant and at the waist. Baby pants in accordance with the invention utilize neither rubber nor fabric and are repellent to liquids including water and urine, and can be stitched with ordinary sewing machinery so that elastic bands may be stitched to the margins at the bottom of each pant and the waist.

It is an object of the instant invention to provide a baby pant made of synthetic material including neither rubber nor fabric which will have elasticized openings for cooperation with the legs and waist of the baby so as to afford the proper protection.

It is another object of the invention to provide a garment including a body portion made of a compounded synthetic film material having the characteristic of being waterproof while being pervious to the passage of moisture vapor therethrough.

It is a further object of the instant invention to provide a comfortable baby pant which will give the wearer the maximum protection and which may be readily manufactured with conventional machinery.

Other objects and the nature and advantages of the invention will be apparent from the following description taken in conjunction with the accompanying drawings wherein.

Figure 1:
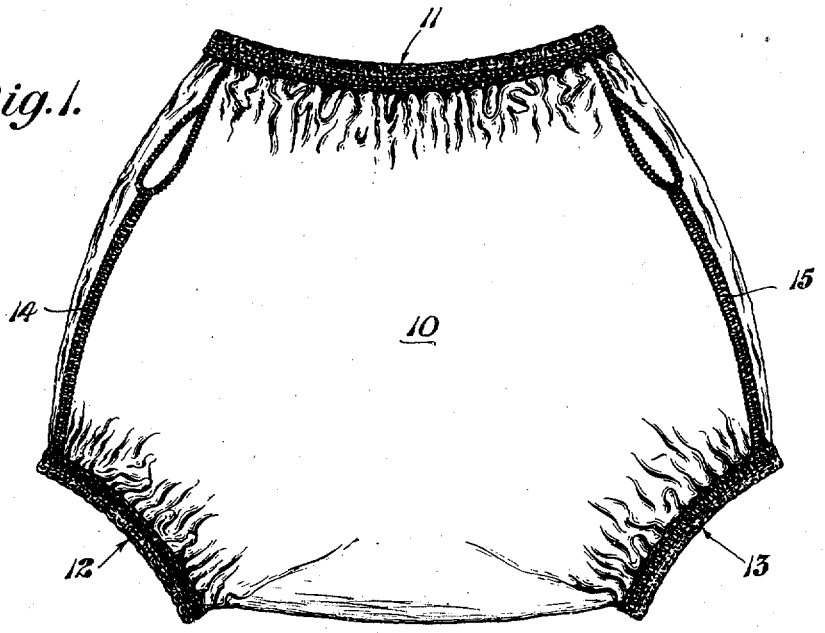
Figure 1 is a view in elevation of a pair of baby pants in accordance with the invention.
Figure 2:
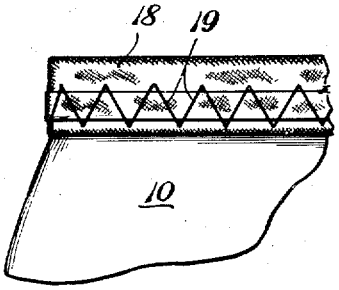
Fig. 2 is a fragmentary view in elevation of a portion of the baby pants showing a stitched elasticized margin which has been stretched.
Figure 3:
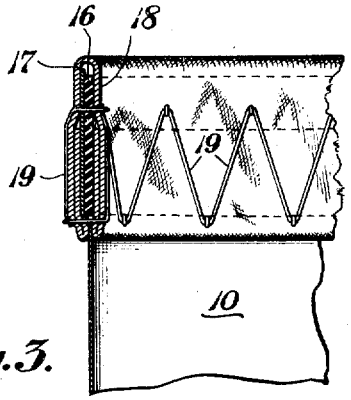
Fig. 3 is a view similar to Figure 2 with a part shown in section.

Referring to the drawing, the baby pants 10 are made of sheet material manufactured as described below and comprises a stitched, elasticized and gathered waist portion 11, a stitched, elasticized and gathered leg opening 12 and a stitched, elasticized and gathered leg opening 13. The sides of the baby pants are also stitched at 14 and 15. Within the marginal openings at 11, 12 and 13 is located the elastic band 16 which is immediately adjacent the marginal end of the sheet material 17 which forms the body of the baby pants and the elastic band 16 and margin of the sheet material 17 are bound by the folded binding material 18 and the stitching 19.

The sheet material for the baby pants in accordance with the invention is manufactured or compounded on calendering equipment. The resin may be of the vinyl family such as the copolymers of vinyl chloride and vinyl acetate. The plasticizer may be di-octyl-phthalate or the reaction product of phthalic anhydride and butyl-cellosolve or a similar plasticizer. A heat stabilizer, such as calcium stearate, is included, which heat stabilizer in addition to other properties, facilitates the proper processing of the material without affecting its color. A lubricant, such as stearic acid is added and also assists in the processing. The pigment which has among other functions, the function of filling, coloring and imparting good aging characteristics is added in the calendering process. Titanium oxide and a small quantity of organic blue may be used as the pigment. It is also necessary to use a solvent which may be selected from one or more of the following group: acetone derivatives, methylethyl ketone, or esters. Similar solvents may also be used.

A sheeting for the baby pants of approximately the following proportions has been found to give excellent results:

| | Parts by weight |
|---|---|
| Resin | 100 |
| Plasticizer | 70 |
| Calcium stearate | 1½ |
| Stearic acid | 1 |
| Pigment | 25 |
| Organic blue | ¼ |

After the materials have been compounded, sheeted and calendered, the resulting film has a shiny or patent leather effect on its surface which prevents soil from adhering to it. Former sheetings or film products used for baby pants had quite a different surface so that if a child wearing such prior baby pants sat on the floor, the baby pants picked up dirt which was not easy to wash off. The film in accordance with the invention can be readily cleaned by simply sponging it off. The film in accordance with the invention is capable of being boiled, washed and ironed. It also remains flexible and does not tear very readily.

The resulting film-like sheet is then cut into a shape corresponding to the front and back of the baby pants which front and back are integral with each other and connected to each other by the material at the crotch. Side seams are formed so as to connect the front with the back to complete the baby pants construction with the exception of stitching the margin of the waist and the margin of the openings for the legs with elastic material. An elasticized binding is then stitched over the margins of the two leg openings and the waist to complete the baby pants.

The stitching is effected with conventional sewing machinery and the film which is quite thin, being only a few thousandths of an inch in thickness, satisfactorily holds the stitches which do not pull out even though the garment be used quite roughly. The stitched garment may be washed, boiled and ironed without affecting the strength of the stitches materially so that after repeated washings, boilings and ironings, the garment is still serviceable.

In order to make the baby pants more comfortable to the wearer without affecting the other advantages inherent in the material referred to above, silica gel or silica aerogel in the amount of approximately 10% of the total weight of the compound may be added as by the addition of silica gel or silica aerogel the resulting film permits the passage of moisture vapor without detracting from the water proofing quality thereof. In a sense, it permits the film to "breathe." The addition of silica gel or silica aerogel to the film compound in the proportion specified does not affect the strength of the stitched joint at the margins of the leg openings and waist of the baby pants.

The film material preferably utilized in the garment described and having the characteristic of being waterproof while being pervious to the passage of moisture vapor therethrough includes vinyl resin, plasticizer and silica gel or silica aerogel.

Wherever the term "a silica gel" appears in the claims, it is intended that both silica gel and silica aerogel be included.

It will be obvious to those skilled in the art that various changes may be made without departing from the spirit of the invention and therefore the invention is not limited to what is described in the specification but only as indicated in the appended claims.

What is claimed is:

1. Baby pants comprising a body portion of synthetic film material, a body opening, an elastic band stitched to said body opening with thread, said film being compounded of vinyl resin, plasticizer, calcium stearate, stearic acid, pigment, a silica gel, said film and said stitching cooperating to provide a relatively strong joint capable of withstanding repeated washings and ironings.

2. Baby pants comprising a body portion of synthetic film material, a body opening, an elastic band stitched to said body opening with thread, said film being compounded of vinyl resin, plasticizer, calcium stearate, stearic acid, pigment, silica aerogel, said film and said stitching cooperating to provide a relatively strong joint capable of withstanding repeated washings and ironings.

3. Baby pants including a body portion made of synthetic film generally in accordance with the following formula:

| | Parts by weight |
|---|---|
| Vinyl resin | 100 |
| Plasticizer | 70 |
| Calcium stearate | 1½ |
| Stearic acid | 1 |
| Pigment Approximately | 25 |

and approximately 10% by weight of the above of a silica gel.

4. Baby pants including a body portion made of synthetic film generally in accordance with the following formula:

| | Parts by weight |
|---|---|
| VYNS vinyl resin | 100 |
| Dioctyl phthalate | 70 |
| Calcium stearate | 1½ |
| Stearic acid | 1 |
| Titanium oxide | 25 |
| Organic blue | ¼ |

and approximately 10% by weight of the above of silica aerogel.

5. In a baby pants, a joint made by stitching an elastic band to a synthetic film, said synthetic film being compounded of vinyl resin, plasticizer, calcium stearate, stearic acid, pigment and a silica gel, said joint comprising thread passing through overlying piercings in the elastic band and the film.

6. Baby pants including a body portion made of a compounded synthetic film material including vinyl resin, plasticizer, and a silica gel.

7. A garment including a body portion made of a compounded synthetic film material including vinyl resin, plasticizer and a silica aerogel.

LE ROY H. RAND.

REFERENCES CITED

The following references are of record in the file of this patent:

UNITED STATES PATENTS

| Number | Name | Date |
|---|---|---|
| 1,314,799 | Guinzberg | Sept. 2, 1919 |
| 1,366,335 | Heitler | Jan. 18, 1921 |
| 1,946,597 | Symonds | Feb. 13, 1934 |
| 1,966,856 | Groff | July 17, 1934 |
| 2,056,796 | Macht | Oct. 6, 1936 |
| 2,093,454 | Kistler | Sept. 21, 1937 |
| 2,168,535 | Nuesslein | Aug. 8, 1939 |
| 2,184,600 | Knup | Dec. 26, 1939 |
| 2,275,957 | Groff | Mar. 10, 1942 |
| 2,306,222 | Patnode | Dec. 22, 1942 |
| 2,329,322 | Baty | Sept. 14, 1943 |
| 2,349,413 | Hemperly | May 23, 1944 |
| 2,349,414 | Ferrer | May 23, 1944 |